United States Patent
Tan et al.

(10) Patent No.: US 8,590,792 B2
(45) Date of Patent: Nov. 26, 2013

(54) APPARATUS FOR AND METHOD OF READING PRINTED AND ELECTRONIC CODES

(75) Inventors: Chinh Tan, Setauket, NY (US); Edward Barkan, Miller Place, NY (US); Mark Drzymala, St. James, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 57 days.

(21) Appl. No.: 13/232,361

(22) Filed: Sep. 14, 2011

(65) Prior Publication Data

US 2013/0062412 A1    Mar. 14, 2013

(51) Int. Cl.
G06K 7/10   (2006.01)
G06K 7/14   (2006.01)
G06K 19/06  (2006.01)
G02B 26/10  (2006.01)
G06K 9/22   (2006.01)

(52) U.S. Cl.
USPC ... 235/455; 235/454; 235/462.01; 235/462.3; 235/462.31; 235/462.42; 235/462.25

(58) Field of Classification Search
USPC ............ 235/462.01, 454, 455, 462.25, 462.3, 235/462.31, 462.42
See application file for complete search history.

(56) References Cited

U.S. PATENT DOCUMENTS

| | | | | |
|---|---|---|---|---|
| 6,749,120 B2 * | 6/2004 | Hung et al. | ............... | 235/472.01 |
| 7,119,759 B2 * | 10/2006 | Zehner et al. | ................. | 345/1.1 |
| 7,337,971 B2 * | 3/2008 | Melick et al. | .............. | 235/462.1 |
| 7,378,940 B2 * | 5/2008 | Jenney et al. | ................ | 340/10.5 |
| 7,798,417 B2 * | 9/2010 | Snyder et al. | ................. | 235/494 |
| 7,809,407 B2 * | 10/2010 | Oshima et al. | ................ | 455/566 |
| 8,002,175 B2 * | 8/2011 | Kuriyama et al. | ............ | 235/379 |
| 8,387,881 B2 * | 3/2013 | Van Volkinburg et al. | ... | 235/455 |
| 2002/0070278 A1 * | 6/2002 | Hung et al. | .............. | 235/472.01 |
| 2002/0195495 A1 * | 12/2002 | Melick et al. | ............ | 235/462.01 |
| 2003/0057284 A1 * | 3/2003 | Challa et al. | ............. | 235/462.46 |
| 2007/0183652 A1 * | 8/2007 | Backstrom et al. | .......... | 382/154 |
| 2010/0245270 A1 * | 9/2010 | Nako | ............................ | 345/173 |
| 2010/0252633 A1 | 10/2010 | Barkan et al. | | |

(Continued)

FOREIGN PATENT DOCUMENTS

EP    2482226 A2    8/2012
WO   2012036882 A1   3/2012

OTHER PUBLICATIONS

International Search Report and Written Opinion dated Dec. 17, 2012 in related case PCT/US2012/0053074.

*Primary Examiner* — Daniel Walsh
(74) *Attorney, Agent, or Firm* — Nong-Qiang Fan

(57) ABSTRACT

An apparatus for, and method of, imaging printed and electronic codes associated with transactions or objects to be processed, support a window on a housing, illuminate the codes through the window with illumination light from an energizable illumination system, capture return illumination light from the illuminated codes through the window with an array of light sensors looking at a field of view of a solid-state, exposable imager, and process the captured return illumination light. A printed code is read by exposing the imager for a first exposure time and by also energizing the illumination system during the first exposure time. An electronic code is read by exposing the imager for a second exposure time that is longer than the first exposure time and by also deenergizing the illumination system during the second exposure time.

18 Claims, 4 Drawing Sheets

(56) References Cited

U.S. PATENT DOCUMENTS

| | | | |
|---|---|---|---|
| 2011/0157089 A1* | 6/2011 | Rainisto | 345/175 |
| 2012/0138684 A1* | 6/2012 | Van Volkinburg et al. | 235/455 |
| 2012/0193429 A1* | 8/2012 | Van Volkinburg et al. | 235/470 |
| 2012/0248184 A1* | 10/2012 | Naito | 235/383 |
| 2013/0082109 A1* | 4/2013 | Meier et al. | 235/462.41 |

\* cited by examiner

APPARATUS FOR AND METHOD OF READING PRINTED AND ELECTRONIC CODES

FIELD OF THE DISCLOSURE

The present disclosure relates generally to an apparatus for, and a method of, imaging targets and, more particularly, to reading printed and electronic codes.

BACKGROUND

Solid-state imaging workstations, that are configured either as vertical slot scanners each having a generally vertically arranged, upright window, or as flat-bed or horizontal slot scanners each having a generally horizontally arranged window, or as bi-optical, dual window scanners each having both generally horizontally and vertically arranged windows, have been installed in many venues, such as supermarkets, warehouse clubs, department stores, and other kinds of retailers for many years, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with objects or products to be processed by the workstations. An operator or a customer may slide or swipe a product associated with, or bearing, a target in a moving direction across and past a window of the workstation in a swipe mode. Alternatively, the operator or the customer may momentarily present the target associated with, or borne by, the product to an approximate central region of a window, and steadily momentarily hold the target in front of the window, in a presentation mode. The choice depends on user preference, or on the layout of the workstation, or on the type of the target.

The symbol targets or codes have typically been printed with ink on such media as paper, foil or film labels directly applied to the products, or directly on paper, foil or film packaging that contain the products, or the printed codes have been printed remotely from the products, such as on membership or customer loyalty cards carried by customers. In recent years, it has become increasingly advantageous to display symbol targets on information display screens, such as display screens of wireless telephones ("cell phones" or "smart phones"), personal digital assistants ("PDAs"), and like mobile electronic devices, including e-readers, portable tablets, slates and computers. Displaying such symbol targets, also known as "electronic codes", on such display screens have become increasingly desirable at such venues as airports and theaters, because they relieve consumers from needing to carry paper coded tickets and coupons.

Known imaging workstations typically include an imaging scan engine or module for supporting a solid-state, image sensor comprising an array of pixels or photosensors, for sensing return light returning through a window of the workstation from a target being imaged. The image sensor may be a one- or two-dimensional charge coupled device (CCD) or a complementary metal oxide semiconductor (CMOS) device, and is analogous to the image sensors used in electronic digital cameras. The known imaging workstations also typically include an illuminating light system for illuminating the target with illumination light from an illumination light source, e.g., one or more light emitting diodes (LEDs), through the window of the workstation; an imaging lens assembly, e.g., one or more imaging lenses, for capturing return ambient and/or illumination light scattered and/or reflected from the target through the window of the workstation over a reading field of view and over a range of working distances relative to the window; and electrical circuitry for producing electronic analog signals corresponding to the intensity of the light captured by the image sensor over the reading field of view, and for digitizing the analog signal. The electrical circuitry typically includes a controller or programmed microprocessor for controlling operation of the electrical components supported by the workstations, and for processing the target and/or decoding the digitized signal based upon a specific symbology when the target is a symbol.

Some known workstations continuously capture and attempt to process and/or decode targets without regard to whether or not a target is actually in the reading field of view of the scan engine. However, continuous, repetitive, flashing of bright light from the LEDs of the illuminating light system consume and waste energy, degrade component lifetimes, and can be perceived as bothersome, distracting and annoying to the operators of the readers and to nearby consumers being served. To alleviate these problems, the known imaging workstations also typically include an object sensing system for activating the scan engine, e.g., the illuminating light system, only if an object or product bearing, or associated with, a target is detected within the active reading field of view of the scan engine. The object sensing system has one or more object light sources for emitting object sensing light, typically infrared (IR) light, and at least one object sensor for sensing the return IR light reflected and/or scattered from the object over an object detection field of view.

Although generally satisfactory for their intended purpose of reading printed codes, the known imaging workstations have not proven to be altogether satisfactory when reading the above-described electronic codes due to specular reflection of the illumination light off the display screens. Display screens can be reflective, i.e., they alter their reflectivity of ambient light to form an image, typically from light and dark pixels, such as passive black and white liquid crystal displays ("LCDs"), or can be emissive, such as backlit LCDs, i.e., they internally generate the light emitted therefrom. Whether reflective or emissive, each display screen includes a glass pane or cover, and the electronic code is displayed behind the glass pane. A portion of the illumination light incident on the glass pane is reflected therefrom back into the reading field of view of the image sensor. This reflected portion of the illumination light creates undesirable one or more hot spots in the reading field of view, at least partially and locally blinds the image sensor, and may significantly compromise reading performance. If the electronic code cannot be successfully read in a first attempt, the scan engine typically tries again and again. Often, the reading fails, and the user must take additional time to manually enter the data that would have otherwise been automatically entered into the workstation.

Accordingly, there is a need for an apparatus for, and a method of, reading both printed and electronic codes with good performance, especially by minimizing, if not eliminating, the deleterious effects of specular reflection of illumination light from a glass pane of a mobile electronic device that is displaying an electronic code.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
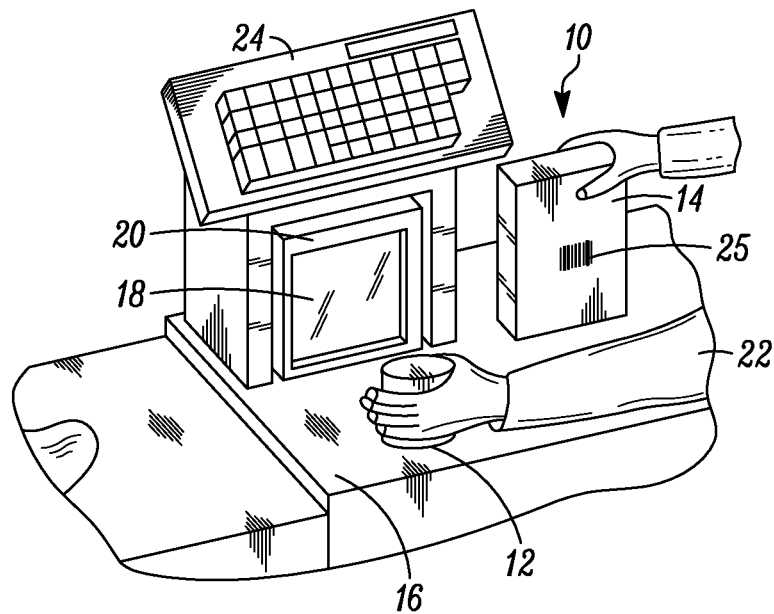
FIG. 1 is a perspective view of an apparatus or electro-optical workstation configured as a vertical slot scanner in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus, in accordance with one feature of this invention, is operative for imaging printed and electronic codes associated with transactions to be processed. The apparatus includes a housing, a window supported by the housing, an energizable illumination system supported by the housing and operative for illuminating the codes with illumination light directed through the window, a solid-state, exposable imager supported by the housing and having an array of light sensors looking at a field of view that extends through the window to the illuminated codes, and operative for capturing return illumination light from the illuminated codes to be imaged, and a controller operatively connected to the imager and the illumination system and operative for processing the captured return illumination light. The controller is operative for reading a printed code by exposing the imager for a first exposure time and by also energizing the illumination system during the first exposure time. The controller is further operative for reading an electronic code by exposing the imager for a second exposure time that is longer than the first exposure time and by also deenergizing the illumination system during the second exposure time.

Thus, each printed code is illuminated and read by the exposed imager during the first exposure time, which advantageously can be very short in duration. The imager operates at an adjustable frame rate (nominally about 60 frames per second with the fastest frame lasting about 16.67 milliseconds). By way of non-limiting example, the first exposure time can be a minor fraction of the fastest frame, e.g., less than 1 millisecond, and preferably less than 0.5 milliseconds. Thus, each printed code can be successfully read fairly quickly, and the reader will have a fast, robust, aggressive performance.

Each electronic code is read by the exposed imager during the second exposure time and not illuminated, thereby effectively preventing the above-described reflections of the illumination light from blinding or saturating the imager and interfering with the reading of the electronic code. The frame rate of the imager is adjusted by the controller, and the controller configures each second exposure time to be longer in duration than the first exposure time. The second exposure time can, for example, be greater than 10 milliseconds, and preferably greater than 30 milliseconds, and even greater than 40 milliseconds. Thus, even though the second exposure time is longer in duration than the first exposure time, each electronic code can be successfully read without being affected by the deleterious effects of specular reflection of illumination light from a glass pane of a mobile electronic device that is displaying the electronic code.

Reference numeral 10 in FIG. 1 generally identifies an electro-optical reading workstation for processing transactions at a checkout counter of a retail site at which objects or products, such as a can 12 or a box 14, each associated with, and preferably bearing, a target 25 such as a bar code symbol, are processed for purchase. As explained above, target 25 is printed on the product and, hence, is hereinafter sometimes referred to as a "printed code" 25. The counter includes a countertop 16 across which the products are presented or slid at a swipe speed past and across a generally vertical or upright, generally planar, light-transmissive window 18 of a box-shaped housing 20 of an imaging reader configured as a vertical slot scanner mounted on the countertop 16. A user 22, preferably a checkout operator or a consumer, is located at one side of the countertop 16, and the housing 20 is located at the opposite side. A cash/credit register 24 is located within easy reach of the user 22. The housing 20 is portable and lightweight and may be picked up from the countertop 16 by the user 22, and the window 18 may be aimed at a printed code 25, preferably on a product too heavy or too large to be easily positioned on the countertop 16 in front of the housing 20 in the workstation mode.

Figure 2:
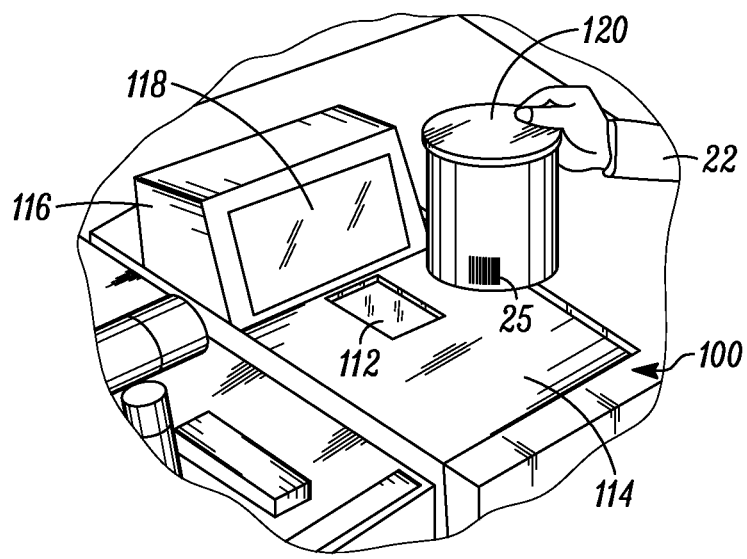
FIG. 2 is a perspective view of another apparatus or electro-optical workstation configured as a dual window, bi-optical workstation in accordance with this invention.

FIG. 2 depicts a dual window, bi-optical, point-of-transaction workstation 100 used by retailers to process transactions involving the purchase of products 120 bearing an identifying target, such as the printed code 25 described above. Workstation 100 has a generally horizontal window 112 set flush with, or recessed into, a countertop 114, and a vertical or generally vertical (referred to as "vertical" or "upright" hereinafter) window 118 set flush with, or recessed into, a raised housing portion 116 above the countertop. In use, the user 22 processes the product 120 bearing the printed code 25 thereon, past the windows 112, 118 by swiping the printed code 25 on the product 120 across a respective window in the abovementioned swipe mode, or by presenting the printed code 25 on the product 120 at the respective window in the abovementioned presentation mode. The printed code 25 may located on any of the top, bottom, right, left, front and rear, sides of the product 120.

Figure 3:
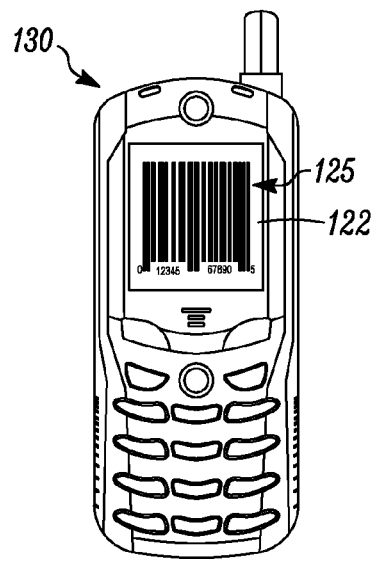
FIG. 3 is a front view of a mobile device displaying an electronic code to be imaged by the workstations of FIGS. 1-2.

FIG. 3 depicts a mobile electronic device 130 configured as a wireless telephone ("cell phone" or "smart phone") having a display screen on which an electronic code 125, as described above, is displayed behind a glass pane or cover 122. The mobile electronic device 130 need not be a telephone, but could be any mobile device capable of displaying electronic codes, such as personal digital assistants ("PDAs"), e-readers, portable tablets, slates and computers. As described below, workstations 10, 100 can not only read the printed code 25, but can also read the electronic code 125 by having the user 22 present the electronic code 125 on the device 130 at the respective window in the abovementioned presentation mode.

Figure 4:
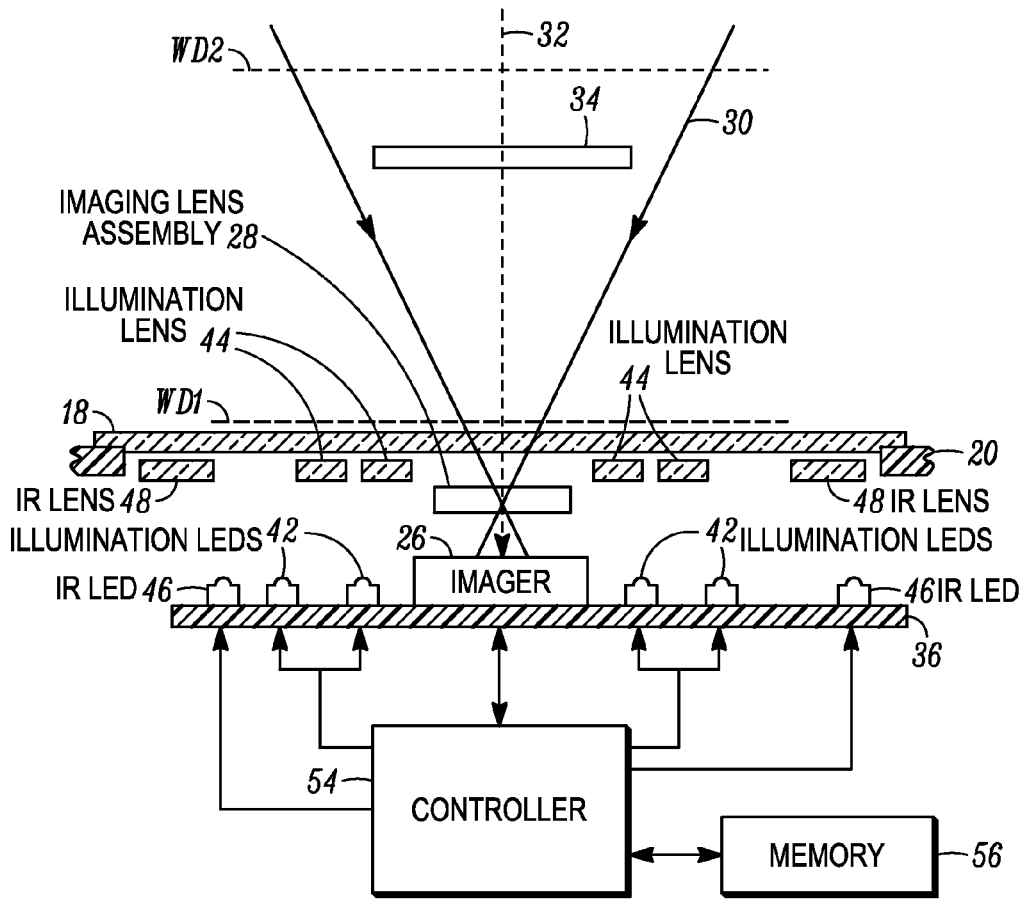
FIG. 4 is a part-schematic, part-diagrammatic view depicting various components of the representative workstation of FIG. 1.

The housing 20 of the workstation of FIG. 1 includes, as schematically shown in FIG. 4, an image sensor or imager 26 having an adjustable frame rate and mounted on a printed circuit board (PCB) 36, and an imaging lens assembly 28 mounted in front of the imager 26. The imager 26 is a solid-state device, for example, a CCD or a CMOS imager and has a linear or area array of addressable image sensors or pixels, preferably of submegapixel or supermegapixel size, having a reading field of view 30 that diverges away from the window 18 in both horizontal and vertical directions. The imaging lens assembly 28 has an optical axis 32 generally perpendicular to the imager 26 and is operative for capturing light through the window 18 from a target symbol 34, for example, the printed code 25 of FIGS. 1-2 or the electronic code 125 of FIG. 3, located in a range of working distances along the optical axis 32 between a close-in working distance (WD1) and a far-out working distance (WD2), and for projecting the captured light onto the imager 26. In a preferred embodiment, WD1 is about two inches from the imager 26 and generally coincides with the window 18, and WD2 is about eight inches or more from the window 18.

An illumination light system is also mounted in the housing 20 and preferably includes a plurality of illumination light sources, e.g., two pairs of light emitting diodes (LEDs) 42, mounted on the PCB 36 and arranged at opposite sides of the imager 26. Two pairs of illumination lenses 44 are mounted in front of the illumination LEDs 42 to uniformly illuminate the target symbol 34 with illumination light.

An object sensing system is also mounted in the housing 20 and is operative for sensing an object, e.g., any of the aforementioned products/devices 12, 14, 120, 130 associated with the target symbol 34, and for generating a trigger signal to initiate the reading. The object sensing system includes an object light source, preferably a pair of infrared (IR) light emitting diodes (LEDs) 46 mounted on the PCB 36 at opposite sides of the imager 26, and a pair of IR lenses 48 mounted in front of the IR LEDs 46, and together operative for directing object sensing IR light, which is invisible to the human eye, in a wavelength range from about 700 nm to about 1100 nm, over a viewing angle through the window 18 at the objects 12, 14, 120, 130 for return therefrom, and an object light sensor 50 (see FIG. 5) for detecting return object sensing IR light returned from the objects 12, 14, 120, 130 along an object detection path through the window 18 over an object detection field of view.

Figure 5:
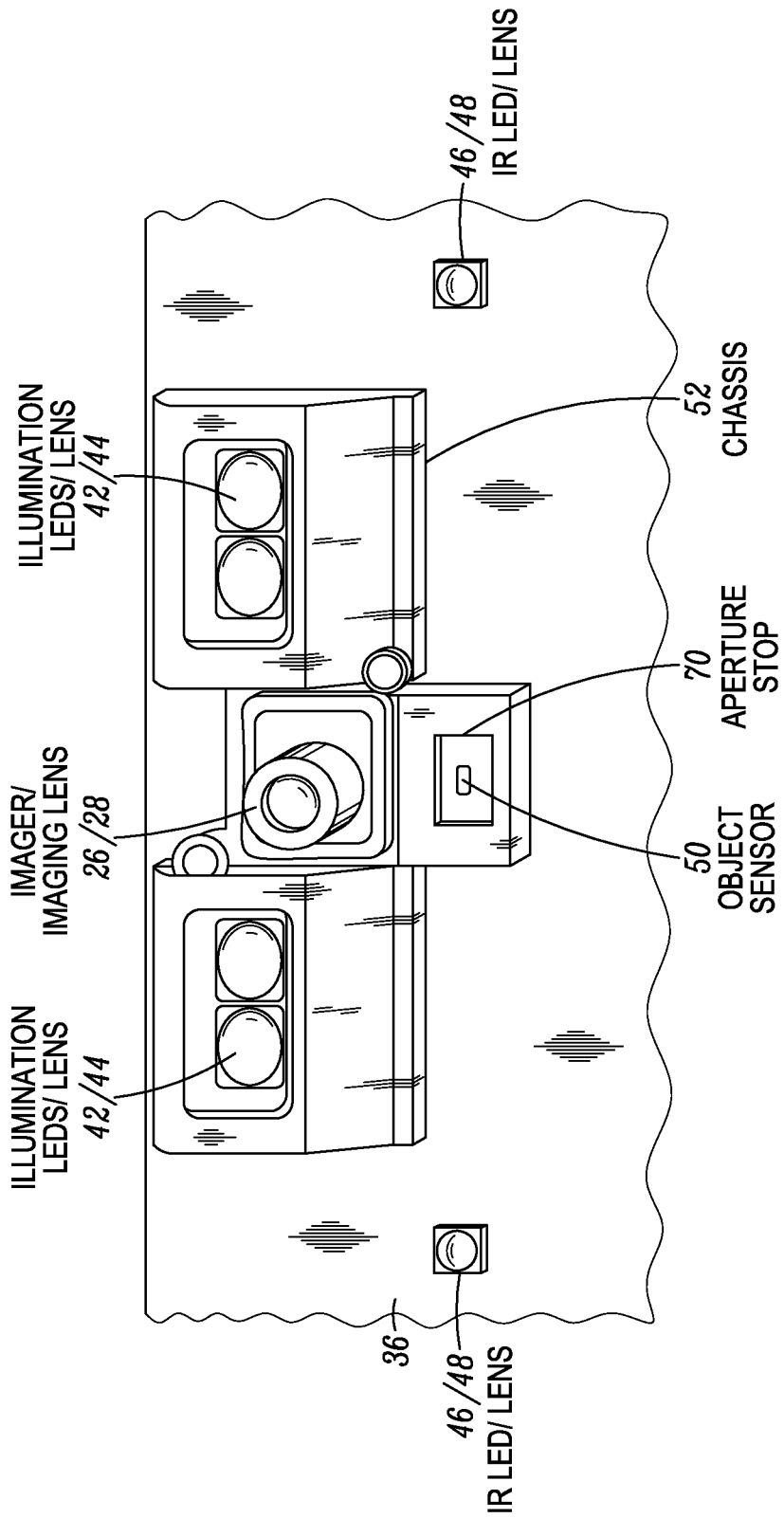
FIG. 5 is a broken-away, enlarged, perspective view depicting some of the components of FIG. 4.

The viewing angle of the IR LEDs 46 is approximately equal to the object detection field of view of the IR object sensor 50 for better system efficiency and pointing in the direction of the object of interest. The object detection field of view substantially overlaps the reading field of view 30. As best seen in FIG. 5, the object IR light sensor 50 is mounted on the PCB 36 between the IR LEDs 46 and below the imager 26. Other locations for the object IR light sensor 50 are contemplated. Also, all of the lenses 28, 44, and 48 are supported by a chassis 52 above the PCB 36 on which the imager 26, the illumination LEDs 42 and the IR LEDs 46 are mounted. The IR object sensor 50 may have an aperture stop 70 and a daylight filter to improve the signal-to-ambient light ratio for better performance. The daylight filter substantially blocks visible light in the range from about 350 nm to about 700 nm and lets the IR light, e.g., about 700 nm to about 1100 nm, pass. A narrow bandpass filter whose bandwidth corresponds to the wavelength of the IR LEDs 46 could also be beneficial.

Returning to FIG. 4, the imager 26, the illumination LEDs 42 and the IR LEDs 46 are operatively connected to a controller or programmed microprocessor 54 operative for adjusting the frame rate of the imager 26 and for controlling the operation of all these electrical components. A memory 56 is connected and accessible to the controller 54. Preferably, the controller 54 is the same as the one used for decoding light scattered from the target symbol 34 and for processing the captured target symbol images.

Figure 6:
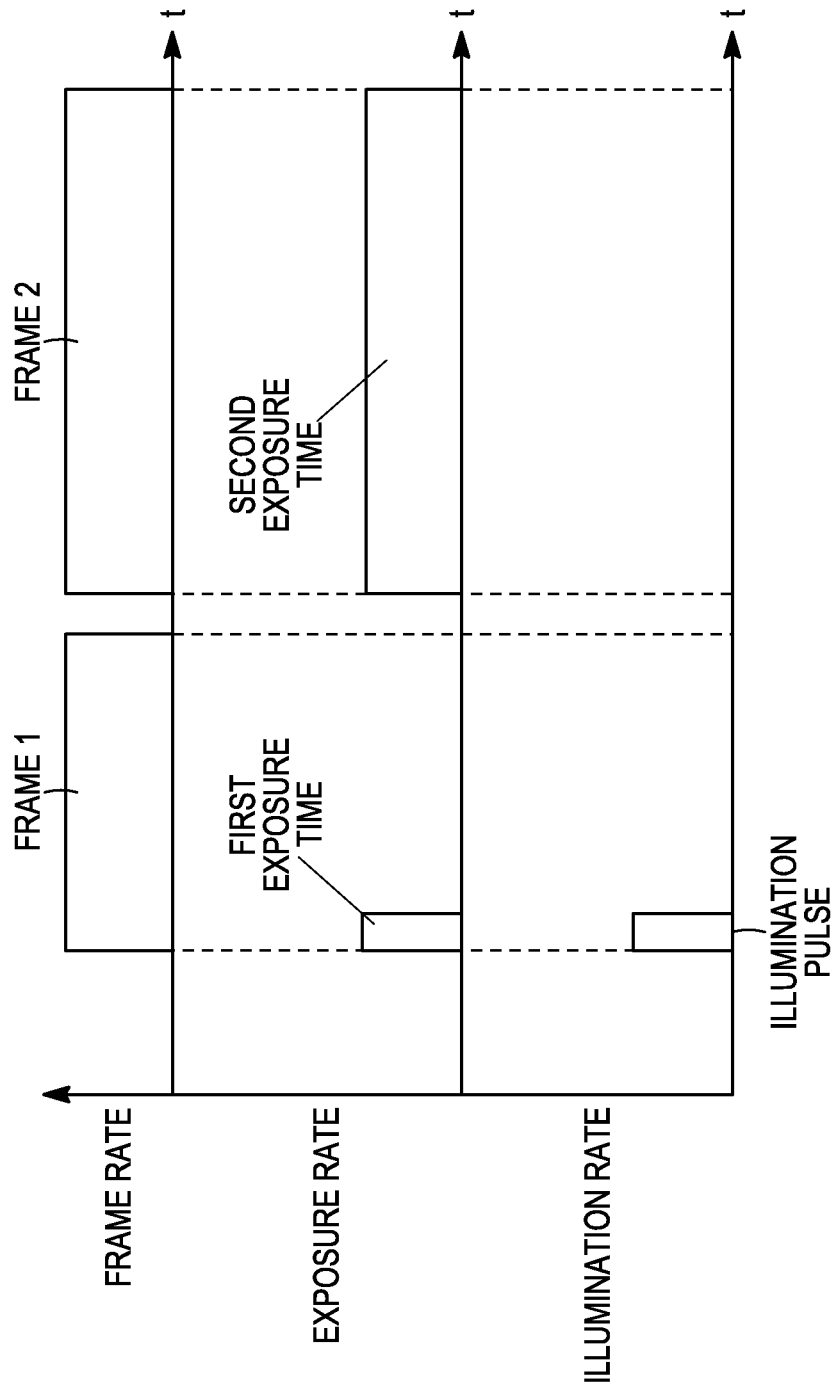
FIG. 6 is a graph depicting operation of some of the components of FIG. 4 in accordance with this invention.

To read the printed code 25, the controller 54 exposes the imager 26 (nominally operated at a frame rate of about 60 frames per second with the fastest frame lasting about 16.67 milliseconds) for a first exposure time (see FIG. 6), and also energizes the illumination LEDs 42 during the first exposure time. By way of non-limiting example, the first exposure time can be a minor fraction of the fastest frame, e.g., less than 1 millisecond, and preferably less than 0.5 milliseconds.

To read the electronic code 125, the controller 54 adjusts the frame rate of the imager 26 and exposes the imager 26 for a second exposure time (see FIG. 6), and also deenergizes the illumination LEDs 42 during the second exposure time. The second exposure time is made longer in duration than the first exposure time to compensate for the absence of the illumination light. The second exposure time can, for example, be greater than 10 milliseconds, and preferably greater than 30 milliseconds, and even greater than 40 milliseconds. Even though the second exposure time is longer in duration than the first exposure time, the extra time is needed in order to successfully read the electronic code 125 without having to deal with reflections of the illumination light off the glass pane 122 of the device 130.

The controller 54 cyclically exposes the imager 26 in any desired sequence of different exposure times. Each sequence has at least one first exposure time and at least one second exposure time. For example, the first and second exposure times can alternate with each other, or one second exposure time can follow a plurality of first exposure times.

For improved performance, rather than having the controller 54 automatically generate such exposure sequences no matter what object is brought to the workstation for processing, the controller 54 can be configured to operate by default in a printed code reading mode of operation, and then, as described below, to automatically change to an electronic code reading mode of operation. In the printed code reading mode, the imager 26 is repeatedly exposed for successive first exposure times, and the illumination LEDs 42 are repeatedly energized for each first exposure time, in order to read the printed codes 25, one after another. In the electronic code reading mode, the imager 26 is exposed for at least one second exposure time, and the illumination LEDs 42 are deenergized during that at least one second exposure time, in order to read the at least one electronic code 25. This change of mode is performed by a mode changing system operative for detecting the presence of the electronic code 125 in the field of view 30, and for alerting the controller 54 to change the mode in response to such detection of the electronic code 125.

In one embodiment, the mode changing system includes the above-described object sensing system operative for detecting how long an object has been positioned in the object detection field of view, and for alerting the controller 54 of the presence of the electronic code 125 when the object has been in the object detection field of view for a duration exceeding a predetermined duration. In the case of the electronic code 125, it is generally presented to, rather than being swiped across, the respective window of the workstation. In this situation, the IR sensor 50 detects a long presence, e.g., one second or more, of the device 130 in the object detection field of view, after which the controller 54 is configured to operate in the electronic code reading mode of operation. To prevent the situation where the user 22 holds a printed code 25 in the object detection field of view of the IR sensor 50 for a long time (e.g., one second or more), the electronic code reading mode can consist of a sequence or combination of longer second exposure times and shorter first exposure times, for example, two longer second exposure times with no illumination light to favor reading an electronic code 125 and a shorter first exposure time with illumination light to favor reading a printed code 25.

In another embodiment, the mode changing system is operative for detecting a hot spot in a field of view, and for alerting the controller 54 of the presence of the electronic code 125 when the hot spot has been detected. As described above, when the electronic code 125 is displayed on the device 130, a portion of the illumination light incident on the glass pane 122 reflects therefrom as a hot spot. The hot spot can be detected by the IR object sensor 50 and/or by the imager 36.

As described so far, the imager 26 has a single reading field of view 30. In some applications, an optical splitter is used to divide the single reading field of view 30 into multiple subfields of view extending in different directions for better coverage of a scan zone in front of the workstation windows. Also, the illumination LEDs 42 may be off-axis, rather than being collinear with the imager 26. In such circumstances, specular reflection of the illumination light may affect only one subfield, rather than all the subfields. Depending on the obliquity of the off-axis illumination light to the electronic code 125, there may not be enough illumination light scattered back to the imager 26 in any one subfield. Nevertheless, detection of a hot spot in any one subfield, or detection of the device 130 in any one subfield, is sufficient cause for the controller 54 to be configured to automatically switch over to the electronic code reading mode of operation.

Although only one imager 26 has been illustrated, it will be understood that any workstation, especially the bi-optical workstation of FIG. 2, can, and frequently do, have more than one imager 26. Detection of a hot spot by any imager is sufficient cause for the controller 54 to be configured to automatically switch over to the electronic code reading mode of operation.

It will be understood that each of the elements described above, or two or more together, also may find a useful application in other types of constructions differing from the types described above. For example, the number of illumination LEDs 42 and their location can be different from those illustrated in the drawings; the number of IR LEDs 46 and their location can also be different from those illustrated in the drawings; and more than one object sensor 50 can be employed. Workstations having different shapes than those illustrated, with one or more windows, are also within the spirit of this invention. For example, a flat-bed workstation having a single generally horizontal window, or a gun-shaped housing mounted on a stationary stand or mount are other advantageous configurations. In addition, although the components of FIG. 4 has been described with respect to the window 18 of the workstation 10, the invention described herein is equally applicable to either window 112 or 118 of the workstation of FIG. 2.

In accordance with another feature of this invention, a method of imaging printed and electronic codes associated with transactions to be processed, is performed by supporting a window on a housing; illuminating the codes through the window with illumination light from an energizable illumination system; capturing return illumination light from the illuminated codes through the window with an array of light sensors looking at a field of view of a solid-state, exposable imager; and processing the captured return illumination light by reading a printed code by exposing the imager for a first exposure time and by also energizing the illumination system during the first exposure time, and by reading an electronic code by exposing the imager for a second exposure time that is longer than the first exposure time and by also deenergizing the illumination system during the second exposure time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately", "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus operative for reading printed and electronically displayed codes on an object, comprising:
    a housing;
    a window supported by the housing;
    an energizable illumination system supported by the housing and operative for illuminating the object with illumination light directed through the window;
    a solid-state, exposable imager supported by the housing and having an array of light sensors looking at a field of view that extends through the window, the array of light sensors operative for capturing light from the object;
    a mode changing system supported by the housing and including an object sensing system for detecting how long an object has been positioned in an object field of view in order to determine presence of an electronically displayed code, wherein the object sensing system includes an object light source operative for emitting object sensing IR light and an object light sensor operative for detecting return object sensing IR light returned from the object over the object field of view;
    a controller operatively connected to the imager and the illumination system and operative for processing the captured light from the object, the controller being operative for exposing the imager for a first exposure time and by also energizing the illumination system during the first exposure time while in a first code reading mode, and operative for exposing the imager for at least a second exposure time that is longer than the first exposure time and by also de-energizing the illumination system during the at least second exposure time while in a second code reading mode; and
    the mode changing system further being (1) operative for directing the controller to operate in the first code reading mode in response to the object sensing system detecting the presence of the object and (2) operative for directing the controller to change from the first code reading mode to the second code reading mode when the object has been in the object field of view for a duration exceeding a pre-determined duration and without a barcode being successfully decoded by the controller when operating in the first code reading mode.

2. The apparatus of claim 1, wherein the controller cyclically exposes the imager in a sequence of different exposure times, the sequence having at least one first exposure time and at least one second exposure time.

3. The apparatus of claim 1, wherein the controller operates the imager at an adjustable frame rate of multiple frames per second, and wherein the first exposure time lasts for a fraction of one frame.

4. The apparatus of claim 1, wherein the controller operates by default in a printed code reading mode of operation in which the imager is repeatedly exposed for successive first exposure times; and further wherein the controller, in response to detection of the electronically displayed code by the mode changing system, changes from the printed code reading mode of operation to an electronically displayed code reading mode of operation in which the imager is exposed for at least one second exposure time.

5. The apparatus of claim 4, wherein the object has a display screen on which the electronically displayed code is displayed.

6. The apparatus of claim 4, wherein the mode changing system is operative for detecting a hot spot in the field of view, and for alerting the controller of the presence of the electronically displayed code when the hot spot has been detected.

7. The apparatus of claim 6, wherein the electronically displayed code is displayed on a display screen, and wherein at least a portion of the illumination light is incident on the display screen for reflection therefrom as the hot spot.

8. The apparatus of claim 1, wherein the window is substantially planar, and wherein the housing supports the window in one of a generally upright and a generally horizontal plane.

9. The apparatus of claim 1, and further comprising another window supported by the housing; wherein each window is substantially planar; and wherein the housing supports one of the windows in a substantially upright plane, and supports the other of the windows in a generally horizontal plane that intersects the upright plane.

10. A method of reading printed and electronically displayed codes on an object, with an electro-optical reading workstation, comprising:
    detecting presence of an object in an object field of view with an object sensing system and detecting how long the object has been positioned in the object field of view, wherein the object sensing system includes an object light source operative for emitting object sensing IR light and an object light sensor operative for detecting return object sensing IR light returned from the object over the object field of view;
    in response to the object sensing system detecting the presence of the object, operating the electro-optical reading workstation in a default mode by exposing an imager for a first exposure time and by also energizing the illumination system during the first exposure time;

determining presence the object that has been in the object field of view for a duration exceeding a predetermined duration; and when the object has been placed in the object field of view for a duration exceeding the predetermined duration and without a barcode being successfully decoded when operating in the default mode, operating the electro-optical reading workstation in another mode by exposing the imager for at least a second exposure time and by also de-energizing the illumination system during the at least one second exposure time, and wherein the second exposure time is longer than the first exposure time.

11. The method of claim 10, wherein the exposing is performed cyclically by exposing the imager in a sequence of different exposure times, the sequence having at least one first exposure time and at least one second exposure time.

12. The method of claim 10, wherein the imager operates at an adjustable frame rate of multiple frames per second, and wherein the first exposure time lasts for a fraction of one frame.

13. The method of claim 10, wherein the printed codes are read by default in a printed code reading mode of operation in which the imager is repeatedly exposed for successive first exposure times and the illumination system is energized for each first exposure time; and further comprising changing from the printed code reading mode of operation to an electronic code reading mode of operation in which the imager is exposed for at least one second exposure time, by detecting the presence of the electronically displayed code in the field of view and by de-energizing the illumination system for the at least second exposure time.

14. The method of claim 10, wherein the object has a display screen on which the electronically displayed code is displayed.

15. The method of claim 13, wherein the changing is performed by detecting a hot spot in the field of view, and by indicating the presence of the electronically displayed code when the hot spot has been detected.

16. The method of claim 15, and displaying the electronically displayed code on a display screen, and wherein at least a portion of the illumination light is incident on the display screen for reflection therefrom as the hot spot.

17. The method of claim 10, wherein the electro-optical workstation comprises a window, supported by a housing, that is substantially planar, and further wherein the housing supports the window in one of a generally upright plane and a generally horizontal plane.

18. The method of claim 17, wherein the electro-optical workstation further comprises another window supported by the housing, wherein each window is substantially planar, and wherein the housing supports one of the windows in a substantially upright plane, and supports the other of the windows in a generally horizontal plane that intersects the upright plane.

* * * * *